T. McDONOUGH.
FISH-PLATE BOLTS FOR RAILWAY-RAILS.
No. 194,360. Patented Aug. 21, 1877.
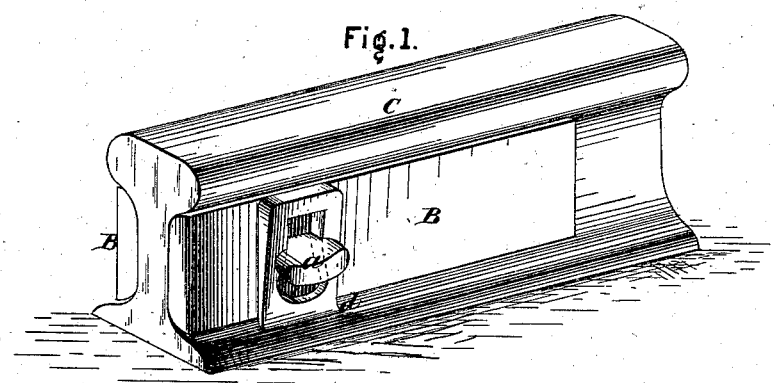
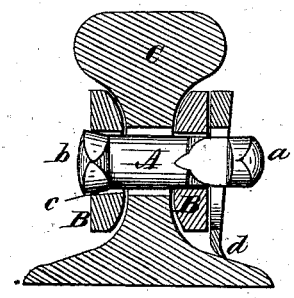
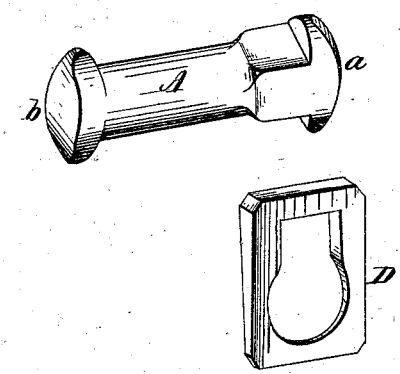
WITNESSES
T. K. Kenny
Harry King
INVENTOR
Thomas McDonough
By Hill Ellsworth
his ATTORNEYS.

UNITED STATES PATENT OFFICE.

THOMAS McDONOUGH, OF MONT CLAIR, NEW JERSEY.

IMPROVEMENT IN FISH-PLATE BOLTS FOR RAILWAY-RAILS.

Specification forming part of Letters Patent No. 194,360, dated August 21, 1877; application filed May 23, 1877.

*To all whom it may concern:*

Be it known that I, THOMAS McDONOUGH, of Mont Clair, in the county of Essex and State of New Jersey, have invented a new and Improved Means for Securing Fish-Plates to Railroad-Rails; and I do hereby declare the following to be a full, clear, and exact description of the same, reference being had to the accompanying drawings, forming part of this specification, in which—

Figure 1 is a perspective view of a railroad-rail and fish-plate secured together by my improved means. Fig. 2 is a transverse section of the same, and Fig. 3 shows perspective views of the bolt and locking-wedge.

Similar letters of reference in the accompanying drawings denote the same parts.

My invention has for its object to provide more efficient means for securing the fish-plates to the joints of railroad-rails, and to dispense with the use of threaded bolts and nuts, which require locking devices to prevent the nuts from turning.

To this end the invention consists of a double-headed bolt and a wedge, in combination with the fish-plates and rails, as I will now proceed to describe.

In the accompanying drawings, A is the bolt, forged with a head at each end, one head, $a$, being of such size that it can readily pass through the holes in the fish-plate B and rail C, and the opposite head, $b$, being made slightly wedge-shaped or beveled to enter the recess $c$ in its fish-plate. The shank of the bolt near the head $a$ is squared, as shown, but otherwise it resembles the bolt in ordinary use, except that it is not provided with a screw-thread.

D is the wedge, provided with an enlarged slot, by which it is slipped over the head $a$ of the bolt, and to turn on the square shanks thereof when it is to be applied. This is effected by first turning the wedge up sidewise and slipping it over the head of the bolt, and then turning it round to a vertical position with its thin edge against the flange of the rail, as shown in Figs. 1 and 2. In this position it is driven firmly down until its thin edge is turned outward by the flange of the rail, as shown at $d$, which prevents it from rising or becoming loosened by the concussion of the car-wheels passing along the rails, while the squared shank prevents the bolt from turning in the rail and fish-plates.

By this means the fish-plates are drawn and held firmly against the rails, thereby forming a firmer and more secure joint with a bolt of a given size than when the bolt is weakened by cutting a screw-thread upon it. It also calls into action the elasticity of the bolt throughout its entire length, instead of throwing the tension upon the screw-threads, as is the case where screw-threaded bolts are employed.

I claim as my invention—

The combination of a double-headed bolt, A $b$ $a$, and a slotted wedge, D, with the fish-plates and railroad-rails, the bolt and wedge being applied thereto, as herein described, and so that the thin edge of the wedge shall be turned outward against the flange of the rail, substantially as set forth, for the purpose specified.

THOMAS McDONOUGH.

Witnesses:
N. O. PILLSBURY,
HUGH GALLAGHER.